W. T. KENNEDY.
HÆMOCYTOMETER.
APPLICATION FILED FEB. 8, 1915.
1,182,384.
Patented May 9, 1916.
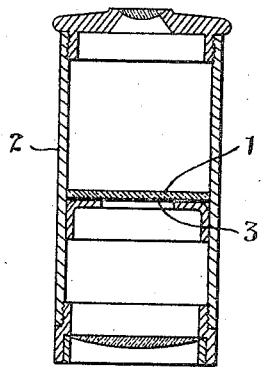
Fig. 1.
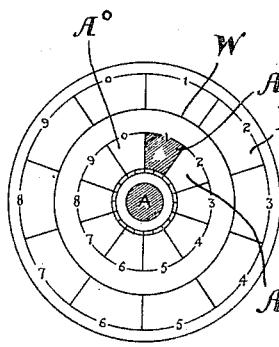 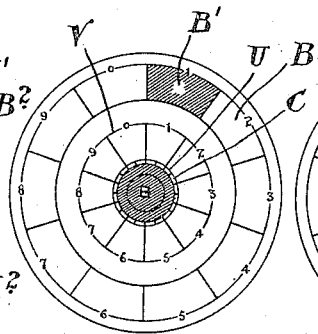 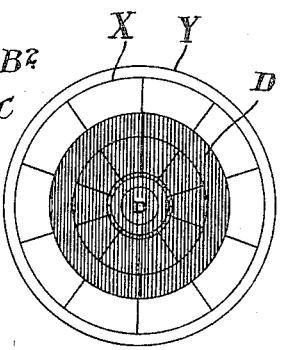
Fig. 2.  Fig. 3.  Fig. 4.
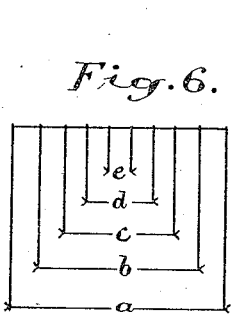 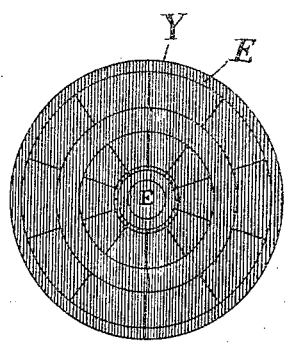
Fig. 6.  Fig. 5.
Witnesses.
Inventor.
W. T. Kennedy

UNITED STATES PATENT OFFICE.

WILLIAM THOMSON KENNEDY, OF TORONTO, ONTARIO, CANADA.

HÆMOCYTOMETER.

1,182,384.   Specification of Letters Patent.   Patented May 9, 1916.

Application filed February 8, 1915. Serial No. 6,833.

*To all whom it may concern:*

Be it known that I, WILLIAM THOMSON KENNEDY, a subject of the King of Great Britain, and resident of the city of Toronto, county of York, Province of Ontario, in the Dominion of Canada, have invented certain new and useful Improvements in Hæmocytometers, described in the following specification and illustrated in the accompanying drawings, that form part of the same.

The principal objects of the invention are to facilitate the counting of red and white corpuscles in the blood and cerebro-spinal fluid and bacteria, providing a scale adapted for use in the eye-piece of the microscope thereby eliminating the difficulties met with in the use of ruled counting chambers in which the ruled lines form ditches or grooves in which the corpuscles concentrate.

A further object is to provide a scale which is arranged in decimal factors and which is adapted for use with various objectives and different ranges of microscopes.

The principal feature of the invention consists in the novel arrangement of a scale in circle formation divided into segments wherein the areas of various divisions are factors of other divisions to allow of universal use.

In the drawings, Figure 1 is a longitudinal sectional view of a microscope eye-piece showing the location of the scaled member. Fig. 2 is an enlarged diagram of the scale. Fig. 3 is an enlarged diagram of the scale showing certain defined corresponding areas. Fig. 4 is an enlarged diagram of the scale showing a special large area defined. Fig. 5 is an enlarged diagram of the scales showing another special area defined. Fig. 6 is an enlarged diagram of the adjusting scale arranged upon the counting chamber.

In reference to the drawings A is a central circular area which when objective 6 or 1/6 is used, incloses 1/500th of a square millimeter of counting chamber. Outside of the area A is a circle inclosing an area B which when objective 3 or 1/3 is used is equal to 1/10 of a square millimeter of counting chamber.

U is a circle surrounding the area B which incloses an annular space for use in counting bacteria. This space is divided by radial division lines into 20 equal spaces C.

V is a circle surrounding the circle U and forming an annular space which is divided by radial lines into 10 equal divisions $A^1$. These divisions $A^1$ are each equal in area to the central area A and are numbered 1 to 0.

W is a circle surrounding the circle V and inclosing a total area D which when objective 3 or 1/3 is used for counting corpuscles in cerebro-spinal fluid incloses 1 square millimeter of counting chamber.

X is a circle surrounding the circle W and inclosing therebetween an annular space which is divided by radial lines into 10 equal spaces $B^1$ which are numbered 1 to 0 each of which are equal in area to the area B.

Y is an outer circle surrounding the circle X and inclosing a total area E which when objective 6 or 1/6 is used incloses an area of 1/10 of a square millimeter.

The scale as thus described is inscribed upon the glass disk 1 arranged intermediate of the length of the eye-piece 2 and the inscribed surface is covered by a protecting glass disk 3 both of which are firmly secured in place.

The counting chamber in which the fluid is placed is provided with a scale of adjusting lines as illustrated in Fig. 6 with which the circle W is focused. In this scale the spaces indicated are measured as follows: $a=1.598$ mm: $b=1.1283$ mm: $c=.5642$ mm: $d=.2382$ mm: and $e=.1802$ mm.

The scales $a$ and $b$ are used in focusing for B areas when the focus of the microscope is adjusted till the diameter of the circle W on the scale coincides with the distance $a$ or $b$ according to the objective used and the scales $c$, $d$ and $e$ are used for A areas.

In counting red blood corpuscles, the blood is diluted to 1 in 200 with normal saline and with objective 6 or 1/6 the areas A, A¹, A², etc., each give an area of 1/500 of a square mm. of counting surface, therefore, with $$\text{Factor } \frac{1}{500} \text{ area.}$$
$$\frac{1}{200} \text{ dilution.}$$
$$\frac{1}{10} \text{ mm. thickness gives factor } \frac{1}{1,000,000}.$$

Therefore, by multiplying the average of the number of corpuscles observed in the areas A, A¹, etc., by 1,000,000 will give the number of red corpuscles per cubic millimeter.

In counting white corpuscles, the blood is diluted to 1 in 10 with one per cent. acetic acid solution to which has been added a few drops of saturated methylene coloring to one ounce of the solution. Using objective 3 or 1/3 and areas B, B¹, B², etc., or with objective 6 or 1/6 and area E gives an area of 1/10 square mm. of area of counting chamber, therefore, $$\text{Factor } \frac{1}{10} \text{ square mm. area.}$$
$$\frac{1}{10} \text{ dilution.}$$
$$\frac{1}{10} \text{ mm. thickness gives factor } \frac{1}{1000}.$$

Therefore, multiplying the average of number of corpuscles observed in B, B¹, etc., by 1000 gives the number of white corpuscles per cubic millimeter.

In counting cerebro-spinal fluid corpuscles, the corpuscles are stained by the use of methylene coloring without dilution. Using objective 3 or 1/3 and area D will give 1 square mm. of counting chamber, therefore, $$\text{Factor 1 square mm. area.}$$
$$\text{1 dilution.}$$
$$\frac{1}{10} \text{ mm. thickness gives factor } \frac{1}{10}.$$

Therefore, by multiplying the number of corpuscles observed in area D by 10 will give the number per cubic millimeter.

In counting bacteria, using objective 6 or 1/6 and area C gives 1/20,000 of a square mm. of area of counting chamber, or using objective 1/12 oil immersion and area A gives 1/2000 square mm. of counting chamber area.

From these examples it will be readily understood that the counting of corpuscles or bacteria is rendered very simple and as the scale is arranged in the eye-piece the surface of the counting chamber may be perfectly smooth. This obviates the difficulties met with in the use of ruled counting chambers where the ruled lines form grooves which concentrate the corpuscles or bacteria and render the counting difficult. The difficulty of difference in focus of the lines and corpuscles is also obviated. The counting areas being arranged in the eye-piece and capable of use with different objectives extends the use of the instrument and insures more accurate work and effects a consequent lessening of the strain upon the eyes. More areas can be obtained and consequently a better average and greater accuracy can be had.

What I claim as my invention is:—

1. A hæmocytometer, comprising, a scale arranged in the eye-piece of the microscope and having annular areas divided into segmental decimal divisions.

2. A hæmocytometer, comprising, a scale adapted to be arranged in the eye-piece of the microscope having a plurality of concentric circular areas and radial division lines dividing certain of the annular areas formed between the circular areas into decimal factors.

3. A hæmocytometer, comprising, a scale adapted to be arranged in the eye-piece of the microscope having a central circular area and a concentric annular area surrounding the central area and divided radially into decimal areas each equal to the central area.

4. A hæmocytometer, comprising, a scale adapted to be arranged in the eye-piece of the microscope having a central inner circular area, a central larger area, an annular area encircling the central areas and forming a decimal multiple of the smaller area and divided radially into areas equal to said smaller area, and an annular area arranged outside the inner annular area forming a decimal multiple of the larger central area and divided radially into areas equal to the larger central area.

5. A hæmocytometer, comprising, a scale adapted to be arranged in the eye-piece of the microscope having a central inner circular area, a central larger area an annular area encircling the central areas and divided radially to form bacteria counting chambers, an annular area surrounding the latter annular area and divided into ten areas each equal to the area of the central inner area, a central area including the aforesaid areas, and an annular area surrounding this latter area divided radially into ten areas each equal to the larger central area within the first annular area.

6. A hæmocytometer, comprising, a scale adapted to be arranged in the eye-piece of the microscope having a central circular area, an annular area encircling said central area divided into ten equal segments, each of said segments having an area equal to the central area, a focusing circle on said scale adapted to represent according to the objective used a diameter of .5642 mm., .2382 mm. or .1802 mm.

7. A hæmocytometer, comprising, a scale arranged in the eye-piece of the microscope and having circular areas divided into decimal factors, and an adjusting scale arranged on the counting chamber slide adapted to be focused with the circle W in the eye-piece.

8. A hæmocytometer, comprising, a scale adapted to be arranged in the eye-piece of the microscope having a central inner circular area, which with objective 6 gives 1/500 of a square mm. of counting chamber, a larger central circular area which with objective 3 gives 1/10 of a square mm. of counting chamber, an annular area surrounding the central areas divided radially into ten areas each equal to the inner central area, and an annular area divided into ten areas each equal to the larger central area.

Signed at the city of Toronto, county of York, Ontario, Canada, this 1st day of Feby. 1915.

WILLIAM THOMSON KENNEDY.

Witnesses:
E. HERON,
H. A. TRIMBLE.

Copies of this patent may be obtained for five cents each, by addressing the "Commissioner of Patents, Washington, D. C."